United States Patent [19]

Lenart et al.

[11] 4,188,132

[45] Feb. 12, 1980

[54] SPIRAL STIRRER UNSUPPORTED AT ONE END

[75] Inventors: Wolfgang Lenart, Ludwigshafen; Wolfgang Rau, Heidelberg; Hubertus Baron, Ludwigshafen, all of Fed. Rep. of Germany

[73] Assignee: BASF Aktiengesellschaft, Ludwigshafen, Fed. Rep. of Germany

[21] Appl. No.: 926,086

[22] Filed: Jul. 19, 1978

[30] Foreign Application Priority Data

Jul. 21, 1977 [DE] Fed. Rep. of Germany ... 2277711[U]

[51] Int. Cl.² ............................................. B01F 7/24
[52] U.S. Cl. .................................. 366/314; 366/319; 366/320; 366/323
[58] Field of Search .................. 366/79, 319, 320, 323, 366/314

[56] References Cited

U.S. PATENT DOCUMENTS

| 1,734,632 | 11/1929 | Merrill | 366/320 X |
| 3,920,223 | 11/1975 | Krueger . | |

FOREIGN PATENT DOCUMENTS

| 131726 | 6/1901 | Fed. Rep. of Germany . | |
| 1218265 | 6/1966 | Fed. Rep. of Germany | 366/320 |
| 1442688 | 11/1968 | Fed. Rep. of Germany . | |
| 1507505 | 4/1969 | Fed. Rep. of Germany . | |

*Primary Examiner*—Edward L. Roberts
*Attorney, Agent, or Firm*—Keil & Witherspoon

[57] ABSTRACT

A spiral stirrer unsupported at one end, for mixing and stirring free-flowing solids, especially in continuous gas phase polymerization. The stirrer comprises a plurality of turns formed from hollow profiles. The botton end of the spiral, facing the bottom of the stirred vessel, is attached to a hub seated on a drive shaft. In the vicinity of the transition from the hub to the first turn of the spiral, a distributor spiral is provided to avoid flowless zones in the hub region. Uniform distribution of the gas entering at the bottom of the vessel is also achieved.

4 Claims, 3 Drawing Figures

A-B

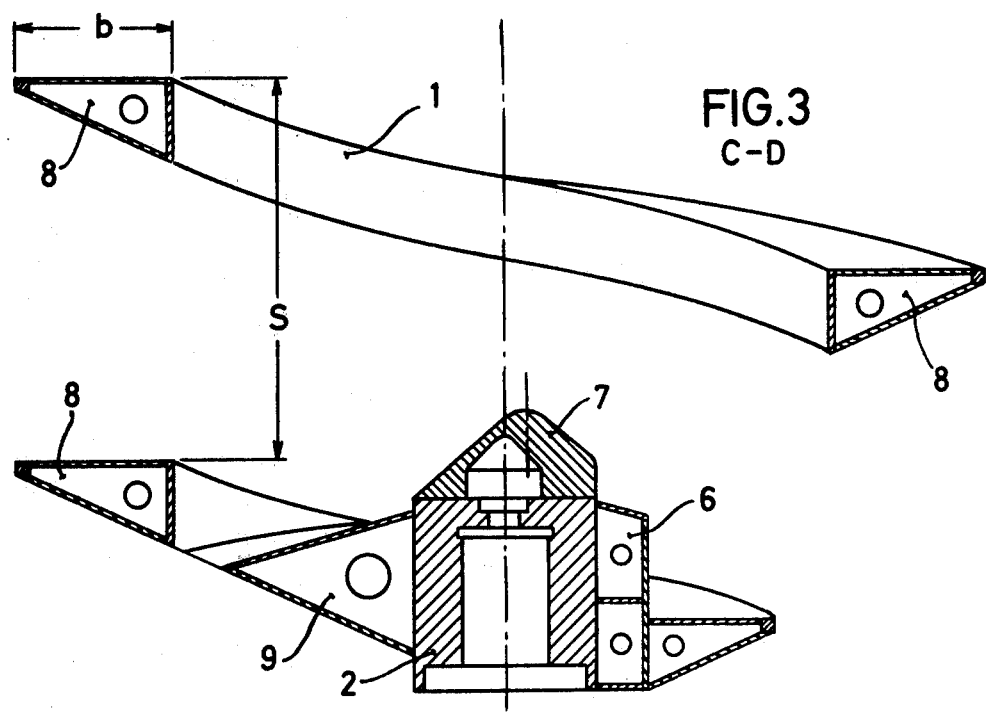

SPIRAL STIRRER UNSUPPORTED AT ONE END

The present invention relates to a spiral stirrer, unsupported at one end, comprising a plurality of turns consisting of hollow profiles, the lower end of the spiral, facing the bottom of the stirred vessel, being attached to a hub which in turn seats on a drive shaft which passes down through the bottom of the vessel. The stirrer serves to mix a bed of free-flowing solids, e.g. a powder bed, which is being agitated in a vertical cylindrical vessel.

The mixing efficiency essentially depends on the number of spiral turns, the pitch of the spiral, the width of the spiral, the speed of the stirrer and the nature of the solids. The stirrer, which is covered by the stirred bed of solids, causes vertical circulation of the solids, the material being conveyed upward on the outside and downward in the middle of the bed. Mixing and stirring of powder beds is particularly difficult to carry out if fresh powder is constantly being formed by polymerization from the gas phase, as is the case, for example, in the continuous gas phase polymerization of propylene and ethylene. In these processes, effective distribution of catalyst, monomeric gas and cooling gas must be ensured by constant circulation of the entire powder bed, so as to avoid local overheating. Such overheating would lead to melting and sintering of the powder and thus interfere with the process as a result of deposition of product on the wall of the vessel and on the stirrer, and due to the formation of agglomerates in the powder bed.

In describing the nature of the invention reference is made to conventional spiral stirrers of the type described in German Pat. No. 1,218,265, which stirrer has hitherto permitted trouble-free polymerization in relatively small reactors. However, on scaling up to larger polymerization reactors, for example of $>10m^3$ capacity, it has been found that such a stirrer is not satisfactory in every respect if trouble-free sustained operation is to be achieved. In the region of the stirrer hub and of the guide vane, in particular, product tends to deposit; this deposit occasionally becomes detached and causes blockages, and hence shutdowns, when the product is discharged from the reactor. Furthermore, sizable lumps are observed, which are evidently formed between the reactor bottom and the zone in which the stirrer takes up product. Product also deposits at the end of the stirrer which dips into the powder bed. These phenomena are attributable to unsatisfactory mixing conditions and mainly occur in the hub region of the stirrer, where the material to be circulated undergoes a change of direction, since there the flow is adversely affected by compressive and shearing stresses. These disadvantages are particularly serious if, for example, ethylene or propylene is introduced into the reactor along the stirrer shaft via a split ring, the ethylene or propylene being introduced both for polymerization and for heat removal. The required uniform distribution of the gas entering at the reactor bottom, which gas may, for example in the case of ethylene or propylene, be completely or partially liquefied and must be uniformly distributed over the powder bed, for polymerization and heat removal, in order substantially to avoid concentration differences and local overheating, is not guaranteed when the conventional spiral stirrer is used.

It is an object of the present invention to provide a spiral stirrer, unsupported at one end, which prevents the above disadvantages.

We have found that this object is achieved if, in the region of the transition from the hub to the first turn of the spiral, a distributor spiral is provided which changes the direction of the stream of fresh gas, also serving as a cooling gas, introduced into the reactor along the stirrer shaft via a split ring, and immediately disperses this stream of gas in the existing circulation of solids. The joint between the spiral and the hub is such that no flowless zones are formed on the lee side of the joint.

An asymmetric cone on the hub has, by virtue of its eccentricity, an advantageous effect on the critical flow zone which occurs at that point, in that it disturbs the static zone which forms there and thereby prevents the formation of undesirable agglomerates.

According to a further characteristic feature of the invention, the spiral tapers outward, in a wedge-like manner, at its free end. As a result of this, the formation of a vortex trail or zone of reduced density at the end of the stirrer which slides through the powder bed is eliminated, so that deposits of product, which tend to form preferentially in such zones, are avoided.

Further, it has been found that straightforward hollow profiles are unsatisfactory as the cross-section of the spiral, regardless of the shape of the cross-section, where stirrers with external diameters upward from about 1,400 mm and stirrer shaft torques upward from 800 daNm are involved, since under these conditions the spiral stirrer does not have sufficient resistance to buckling; it may be noted that the stirrer is additionally subjected to brief pressure differences of at least 25 bars. This disadvantage of insufficient buckling resistance has been overcome, according to the invention, by providing the hollow spiral cross-section with bulkhead plates, located at intervals corresponding approximately to the width of the spiral blade. This construction is made possible by the fact that the spirals are built up from segments, i.e. they consist of box-like sections joined end to end.

Spirals constructed in this way can be used in very large stirred vessels. For example, using a spiral stirrer, unsupported at one end, with an external diameter D of 2,560 mm, a pitch S of 1,000 mm, 3.75 turns and a blade width b of 400 mm, exceptional dimensional stability of the stirrer was observed even at stirrer shaft torques of 6,000 daNm. Using sheet from 12 to 14 mm thick it is possible to construct a relatively light-weight stirrer which has the further advantage of being little subject to inertia forces.

An embodiment of the spiral stirrer according to the invention is shown schematically in the drawing which comprises FIGS. 1 to 3, and is explained in more detail below.

FIG. 3 is a part-sectional side view along the line C—D.

Figure 1:
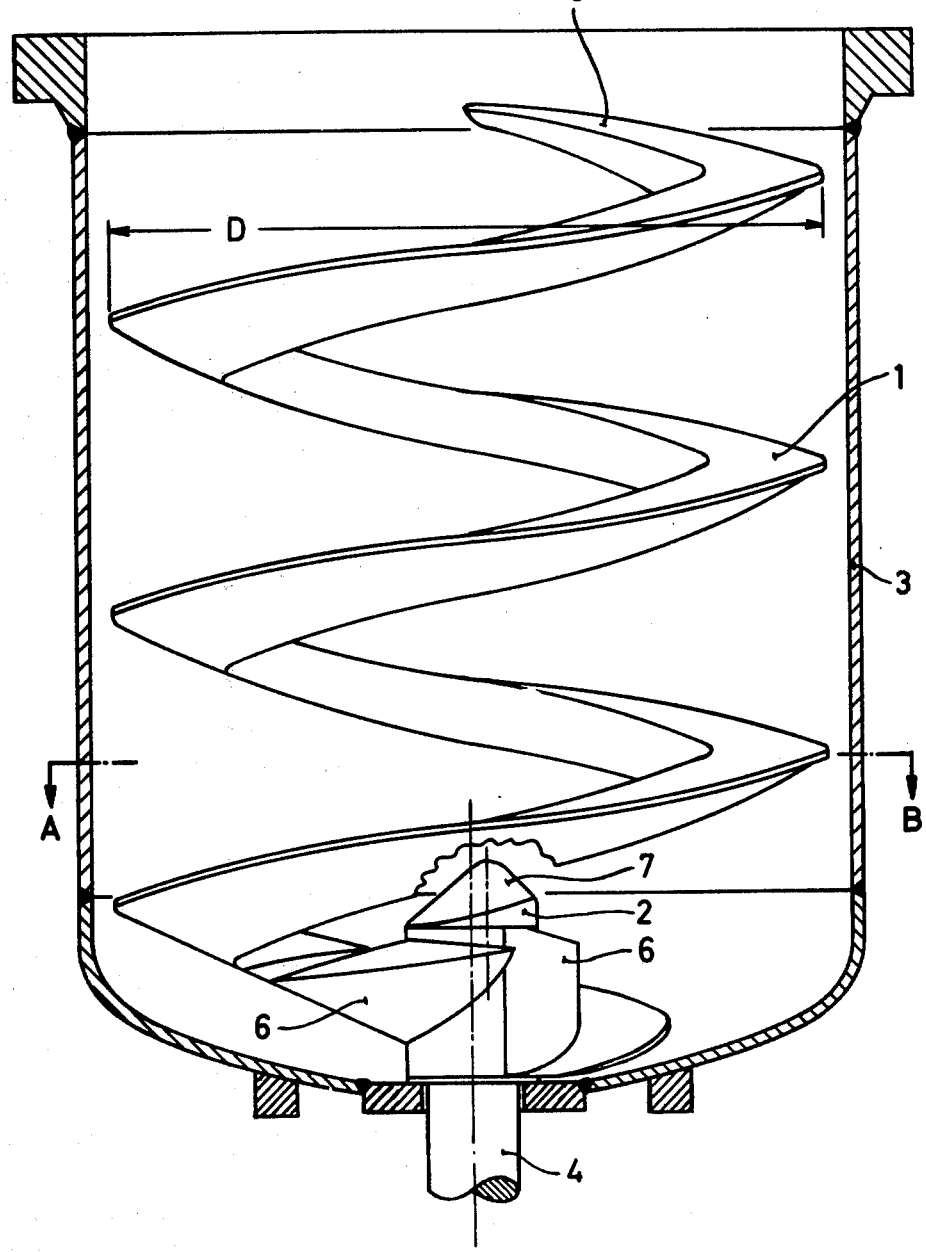
FIG. 1 is a part-sectional view of the stirrer assembly, with the stirrer fitted into a stir vessel.

According to FIG. 1, the stirrer is constructed in the form of a spiral 1, which is unsupported at its upper end, has a plurality, advantageously from 3 to 5, of turns, and is connected, at its lower end, to a hub 2 via a distributor spiral 6.

The distributor spiral serves to change the direction of the stream of fresh gas and cooling gas, which enters through a gap between stirrer shaft 4 and the stirrer shaft bore and flows vertically upward and to disperse the stream immediately over the entire cross-section of vessel 3. Advantageously, the distributor spiral consists of a triangular hollow profile tapering in the direction of rotation and is spirally wound round hub 2.

Figure 2:
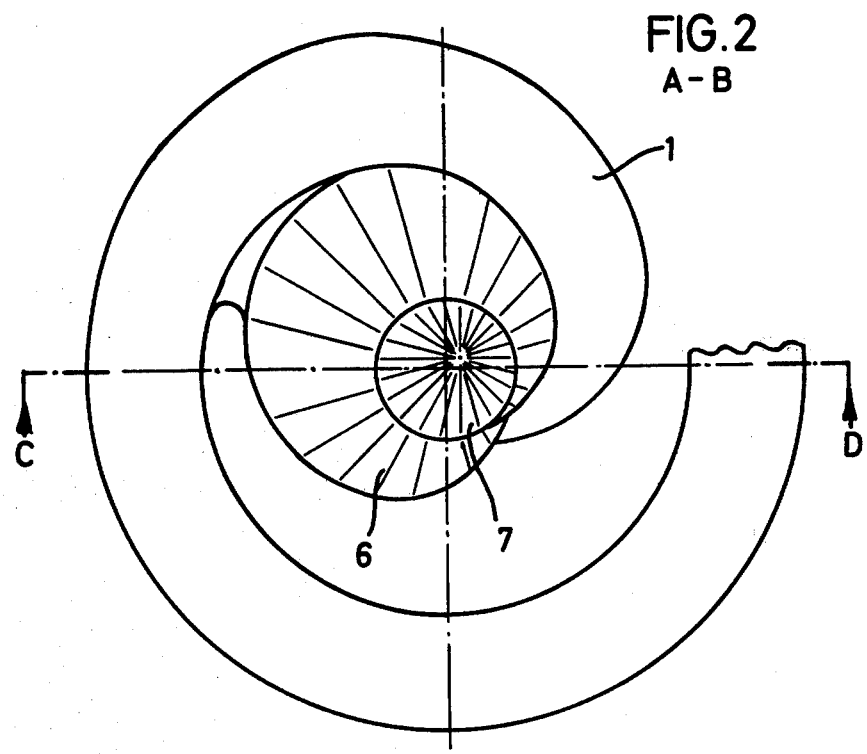
FIG. 2 shows a plan view, along the line A—B, of the stirrer shown in FIG. 1.

As mentioned above, the flow conditions resulting from the rotation of the spiral are such that the material is conveyed upward on the outside and downward in the center of the bed, that is, the spiral rotation is in a clockwise direction as viewed in FIG. 2. The foregoing effect is increased by the distributor spiral which, as may be seen particularly from FIG. 3, tapers in the just-mentioned direction of rotation and with regard to both its upper and lower surfaces.

Recirculation is also enhanced by an asymmetric cone 7 on hub 2. The eccentricity of this cone has been schematically indicated in the drawings which are not true to scale. Advantageously this eccentricity should be about half the diameter of the shaft. The eccentricity of cone 7 effectively prevents deposits of product in the zone in question, where there is little flow.

5 is the free end of the spiral, the cross-section of which tapers outward over a zone of from 90° to 120°, thereby resulting in non-vortical flow at the surface of the bed and also counteracting the formation of deposits. Bulkhead plates 8, which are welded on all their end faces to the profile walls, ensure that spiral 1 has exceptional resistance to buckling, especially under extreme load, such as results when the vessel is rapidly let down. A similar bulkhead 9 is welded to the walls of the distributor spiral 6.

We claim:

1. In a spiral stirrer assembly comprising a stir vessel, a stirring spiral unsupported at its upper end and comprising a plurality of spiral turns of hollow profiles, the lower end of the spiral, facing the bottom of the stir vessel, being attached to a hub in turn seated on a drive shaft which passes through the bottom of the stir vessel,
the improvement
that a distributor spiral element is provided on said hub at a level where it forms a transition from said hub to the first turn of the spiral.

2. In a spiral stirrer assembly the improvement as claimed in claim 1, wherein an asymmetric cone is mounted on top of said hub.

3. In a spiral stirrer assembly the improvement as claimed in claim 1, wherein the spiral tapers outward in a wedge-like manner at its free end.

4. In a spiral stirrer assembly the improvement as claimed in claim 1, wherein the spiral cross-section is provided with bulkhead plates which are located at intervals corresponding approximately to the width of the spiral blade.

* * * * *

UNITED STATES PATENT AND TRADEMARK OFFICE
CERTIFICATE OF CORRECTION

PATENT NO. : 4,188,132
DATED : February 12, 1980
INVENTOR(S) : Wolfgang Lenart et al It is certified that error appears in the above-identified patent and that said Letters Patent are hereby corrected as shown below:

IN THE HEADING:

[30] Foreign Application Priority Data

"227711[U]" should read

-- 77 22 777 --.

Signed and Sealed this

Twentieth Day of May 1980

[SEAL]

Attest:

SIDNEY A. DIAMOND

Attesting Officer

Commissioner of Patents and Trademarks